H. A. KENNEDY.
SIGNALING MECHANISM FOR BALING MACHINES.
APPLICATION FILED JAN. 8, 1918.
1,320,010.
Patented Oct. 28, 1919.
2 SHEETS—SHEET 2.
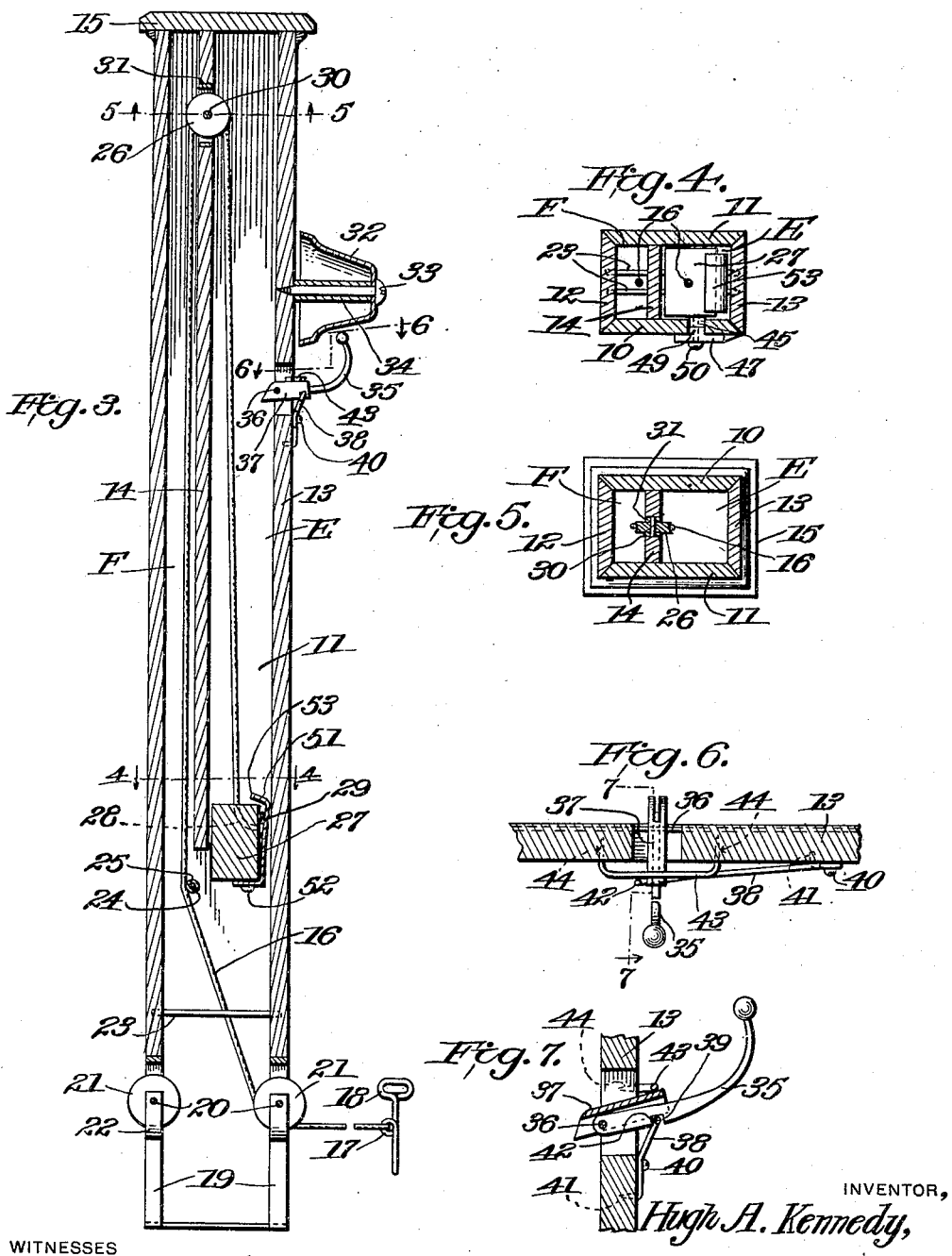
INVENTOR,
Hugh A. Kennedy,
WITNESSES
BY
ATTORNEY.

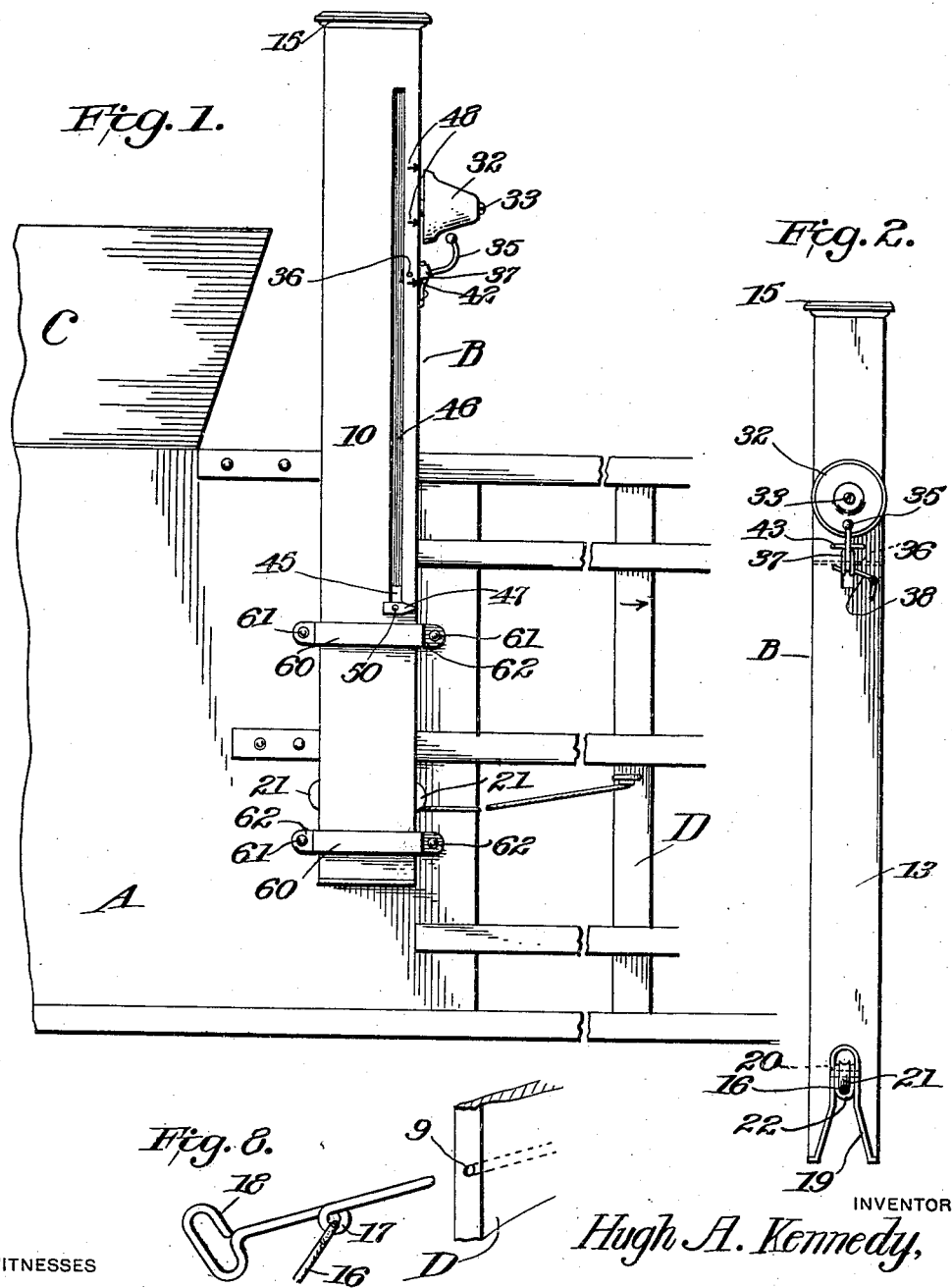

UNITED STATES PATENT OFFICE.

HUGH A. KENNEDY, OF METALINE, WASHINGTON.

SIGNALING MECHANISM FOR BALING-MACHINES.

1,320,010. Specification of Letters Patent. Patented Oct. 28, 1919.

Application filed January 8, 1918. Serial No. 210,892.

*To all whom it may concern:*

Be it known that I, HUGH A. KENNEDY, a citizen of the United States, residing at Metaline, in the county of Pend Oreille and State of Washington, have invented certain new and useful Improvements in Signaling Mechanism for Baling-Machines, of which the following is a specification.

My invention relates to a signaling or alarm attachment for hay baling machines and it serves to apprise the operator or operators when a predetermined quantity of hay has been supplied to the feeding mechanism so that the supply may be stopped or the quantity for a further supply properly determined. The invention reduces the labor incidental to baling especially in that it enables the services of the caller or one who calls "last feed" or the equivalent for the attention of the feeder, to be entirely dispensed with, and also especially on the part of the feeder as he need not depend upon the caller or observe the condition of nor quantity of hay in the baling chamber from time to time.

In accomplishing said desideratum, I aim to provide an indicating mechanism operable through movement of the head block of the baling machine, or other appropriate part of the machine, and serviently to provide all of the combinations, arrangement, and particular details of construction of the parts employed as will be hereinafter particularly described and claimed.

Accompanying drawings illustrate one preferred embodiment of the invention and they are to be considered in connection with the following specification.

In said drawings:—

Figure 1 is a view showing my improvements in front elevation and as attached to a baling machine, the latter being shown fragmentarily;

Fig. 2 is a side elevation of my improved attachment, looking from the right of Fig. 1;

Fig. 3 is a vertical sectional view on an enlarged scale through the attachment and taken at right angles to Fig. 2;

Fig. 4 is a cross sectional view on the line 4—4 of Fig. 3;

Fig. 5 is a cross sectional view on the line 5—5 of Fig. 3;

Fig. 6 is an enlarged sectional view on the line 6—6 of Fig. 3;

Fig. 7 is a cross sectional view on the line 7—7 of Fig. 6; and

Fig. 8 is a detail perspective view of a fragment of the head block of the baling machine and the pin attachable thereto as part of my improvement.

Referring specifically to the drawings, A designates a fragment or portion of a conventional type of hay baling machine to illustrate the application of my invention. My improvements are generally designated B and are fastened to the baling machine adjacent the feeding mechanism or feed chute at C. The head block or plunger of the baler slides longitudinally of the baling chamber in the usual manner and in the direction of the arrow shown in Fig. 1 and is designated D and has one or more recesses 9 extending inwardly from an outer edge, as particularly shown in Fig. 8.

Any approved form of casing may be used to house the operating parts of my improvement. The particular casing illustrated is hollow and substantially rectangular in cross section, having front and rear walls 10 and 11 respectively, and side walls 12 and 13. A partition wall 14 extends longitudinally of the casing and is separated from the walls 12 and 13 as shown in Figs. 3, 4 and 5. The casing is preferably closed by a top or crown plate 15 and the bottom is preferably open, so that dust may fall from the interior of the casing and not unduly accumulate therein.

I employ a means to be moved by the head block D in order to operate the alarm or signal. This means is preferably in the nature of a flexible metallic cable 16 which is connected at one end to a connecting pin, preferably by tying at an eyelet 17 thereof. The pin may be made from a single strand of wire as best illustrated in Fig. 8. This strand is bent intermediate the ends of the pin proper to provide the eyelet 17 and one end is bent into a grip or finger-piece 18. The pin proper is insertible into the recess 9.

Walls 12 and 13 adjacent their bases are cut away or bifurcated and along the cut edges are reinforced by suitably attached metallic straps 19 if desired. The straps 19 mount pivots 20 on which rollers or pulleys 21 are pivoted. U-shaped sheaves 22 are suspended from the pivots 20 as particularly shown in Fig. 2. The attachment is capable of use on either side of the machine and therefore pulleys 21 are suitably mounted on both the walls 12 and 13. The cable 16 extends into the casing, trained on the desired pulley 21 and being held against displacement therefrom by the proper sheave 22. The cable 16 then passes intermediate guide rods 23 mounted in the walls 12 and 13 and then, if desired, over a roller 24 mounted by a rod 25 mounted by walls 10 and 11, then passed upwardly through the chamber F over a pulley 26, and down the chamber E and being attached at an extremity of the cable within said chamber to a weight 27 as by passing the cable through a slot 28 in the weight and tying a knot 29 at the end of the cable after such passage. Pulley 26 is mounted by a rod or short shaft 30 utilizing a metallic frame 31 as its bearing. Frame 31 protects the walls at the cut-away portion of partition 14 which provides the opening for its reception and disposition of pulley 26.

As the head block moves on the compression stroke, it draws the cable 16 over the pulleys described thus moving the weight 27 upwardly in the chamber E in order to operate an alarm or indicating mechanism now to be described.

A bell 32 is suitably fastened as by means of a screw 33 and a sleeve 34, in spaced relation to and from wall 13 as shown in Fig. 3. The clapper for bell 32 is designated 35 and is in the form of a lever having a pin or short shaft 36, as its fulcrum. Said rod or shaft 36 is suitably mounted by the wall 13. A depressing lever for the clapper 35 is employed, being shown at 37. This lever is U-shaped in cross section and its side walls are fulcrumed on the rod 36. Lever 37 does not snugly fit the rear end of the clapper 35 but does fit it in such a manner that it may have an upward movement to a slight extent independently of the clapper and from the pivot 36. At the forward end, clapper 35 is held in its normal position shown in the drawings by means of a spring 38 which extends into a notch 39 of the clapper and which may be fastened to the wall 13 by a screw at 40 and a prong at 41. Specifically, a substantially horizontal portion 42 of the spring 38 extends into the notch 39, and on this portion the lever 37 rests. A spring 43 has a horizontal portion spaced from the wall 13 as shown in Figs. 6 and 7 to engage the upper wall or extremity of lever 37. This spring has a resilient wire formed at its ends into prongs 44 which penetrate the wall for its support.

Weight 27 has an integral rib or spline 45 which extends into a vertically elongated slot 46 provided in the wall 10 of the casing. An indicator 47 is employed to coöperate with suitable indications 48 on the exterior wall 10 adjacent the bell 32 and this indicator has an integral rib or spline 49 which extends into the recess 46 and abuts the rib or spline 45. The indicator is secured to the weight as by means of a set screw 50.

Weight 27 is adapted to strike the lever 37 which slides in its path of movement. However to reduce the impact, a suitably shaped yieldable strap 51 is secured to the weight 27 as by means of a set screw 52. This strap at its top is bent and extends inwardly over the weight providing a portion 53 which directly engages the lever 37 on the downward movement of the weight.

Any suitable means may be employed to connect the apparatus to either side of the baling machine. However, substantially U-shaped straps 60 have been found convenient for this purpose and may be attached by means of bolts 61 passing through cleats 62 and the part A.

In actual operation, the length of the cable is proportioned to the throw or extent of movement of the head block D. Pin 18 prior to a baling operation, is removably inserted into the recess 9. As the baling operation starts and continues, the head D draws the cable with it over the pulleys 21, 24 and 26, thus elevating the weight 27. When near the end of the baling stroke or at any suitable stage of the operation, according to the position of the lever 37, the portion 53 associated with the weight 27 will strike the lever 37 from beneath and within the chamber E, thus causing the forward end of the lever 37 to engage lever 35 and depress it against the tension of the spring 38. The movement of weight 27 continues and completely passes the lever 37 whereupon the tensioned spring 38 will spend its force and strike the clapper against the bell 32, sounding the alarm. This alarm keeps the feeder on his guard so that he may discontinue feeding hay to the feeding mechanism C or only feed the desired quantity remaining for the bale as predetermined. At the end of the stroke, pin 18 is disengaged from the recess 9 whereupon the weight 27 will descend in the chamber E and move the pin to starting position. As the weight moves downwardly in chamber E, it strikes the lever 37 and raises it upwardly at the forward end and forwardly at the lower inner end against the tension of spring 43, so that the weight 27 may pass the lever on the down stroke and the spring 43 may return the lever 37 to normal position for operation on the next up stroke.

Since merely the preferred embodiment of the invention has been illustrated and described, it is to be understood that changes in the details of construction may be resorted to without departing from the spirit and scope of the invention as defined by appended claims.

I claim:—

1. In indicating mechanism, a support, an alarm mounted therefrom, a clapper associated with the alarm, an operating lever for the clapper, a pivot rod passing through both the lever and the clapper, said lever extending beyond the clapper at the pivot, said lever being movable against the clapper in one direction and independently of the clapper in the opposite direction, a spring bearing against the operating lever, said clapper having a notch, and a spring extending into said notch and having the operating lever resting thereon.

2. A signaling mechanism for baling machines including a supporting structure equipped with a bell, a clapper pivotally mounted in the support and adapted for contact with the bell and having a recess therein to receive a spring member, and a lever arranged over the clapper and having its inner end projected into said support for contact with an object moving in the latter, substantially as specified.

In testimony whereof I affix my signature in presence of two witnesses.

HUGH A. KENNEDY.

Witnesses:
D. B. McMILLAN,
S. E. YOUNG.

Copies of this patent may be obtained for five cents each, by addressing the "Commissioner of Patents, Washington, D. C."